United States Patent
Cox et al.

(10) Patent No.: US 11,918,942 B2
(45) Date of Patent: Mar. 5, 2024

(54) IN PROCESS SCREEN PARAMETER MEASUREMENT AND CONTROL

(71) Applicant: SCHLUMBERGER TECHNOLOGY CORPORATION, Sugar Land, TX (US)

(72) Inventors: Chase Cox, Radford, VA (US); Michael Victor Robbins, Houston, TX (US); Jared Joseph Stackman, Houston, TX (US); Luis Porras, Humble, TX (US); Jiawei Dong, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 945 days.

(21) Appl. No.: 16/760,846

(22) PCT Filed: Oct. 31, 2018

(86) PCT No.: PCT/US2018/058353
§ 371 (c)(1),
(2) Date: Apr. 30, 2020

(87) PCT Pub. No.: WO2019/089691
PCT Pub. Date: May 9, 2019

(65) Prior Publication Data
US 2022/0241709 A1    Aug. 4, 2022

Related U.S. Application Data

(60) Provisional application No. 62/579,451, filed on Oct. 31, 2017.

(51) Int. Cl.
*B01D 39/12* (2006.01)
*G06T 7/00* (2017.01)
(Continued)

(52) U.S. Cl.
CPC ............ *B01D 39/12* (2013.01); *G06T 7/0004* (2013.01); *G06T 7/62* (2017.01); *G06T 7/70* (2017.01);
(Continued)

(58) Field of Classification Search
None
See application file for complete search history.

(56) References Cited

U.S. PATENT DOCUMENTS 4,914,514 A  *  4/1990  Smith ................... B01D 29/48
                                             29/896.61
2004/0258293 A1    12/2004  Rouse et al.
(Continued)

FOREIGN PATENT DOCUMENTS

| CN | 0062716 A1 | 10/1982 |
| CN | 2236349 Y | 10/1996 |

(Continued)

OTHER PUBLICATIONS

International Search Report and Written Opinion issued in the PCT Application PCT/US2018/058353, dated Apr. 17, 2019 (10 pages).
(Continued)

*Primary Examiner* — Benjamin M Kurtz
(74) *Attorney, Agent, or Firm* — Jeffrey D. Frantz (57) ABSTRACT

A technique facilitates construction of a wire-wrapped screen. A wrapping machine is operated with a sensor, e.g. a camera, positioned adjacent the wrapping machine while wire is wrapped to create the wire-wrapped screen. The sensor is used to obtain data on at least one parameter of the wire-wrapped screen during creation of the wire-wrapped screen. Data is provided to a controller in communication with the wrapping machine to improve the quality of the wire-wrapped screen. For example, data from the images obtained via the camera may be provided to the controller
(Continued)

which is configured to determine slot width as the wire is wrapped. The controller is then able to provide feedback in real time to the wrapping machine so as to adjust the wrapping machine for maintaining a desired slot width.

13 Claims, 5 Drawing Sheets (51) Int. Cl.
G06T 7/62 (2017.01)
G06T 7/70 (2017.01)
G06V 10/141 (2022.01)
G06V 10/44 (2022.01)

(52) U.S. Cl.
CPC .......... *G06V 10/141* (2022.01); *G06V 10/457* (2022.01); *B01D 2239/0695* (2013.01); *G06T 2207/30164* (2013.01)

(56) References Cited

U.S. PATENT DOCUMENTS

| | | | | |
|---|---|---|---|---|
| 2005/0125980 A1* | 6/2005 | Rakow, Jr. | ............ | B01D 29/111 29/505 |
| 2009/0008085 A1 | 1/2009 | Roaldsnes | | |
| 2011/0290503 A1 | 12/2011 | Boone | | |
| 2015/0102014 A1 | 4/2015 | Everritt et al. | | |
| 2016/0191911 A1* | 6/2016 | Filhaber | ................ | G01B 5/012 348/95 |
| 2016/0274561 A1 | 9/2016 | Stone | | |
| 2017/0214834 A1 | 7/2017 | Downing | | |

FOREIGN PATENT DOCUMENTS

| | | | |
|---|---|---|---|
| CN | 2276074 | Y | 3/1998 |
| CN | 1671894 | A | 9/2005 |
| CN | 101021604 | A | 8/2007 |
| CN | 200978660 | Y | 11/2007 |
| CN | 201170088 | Y | 12/2008 |
| CN | 101437998 | A | 5/2009 |
| CN | 201448099 | U | 5/2010 |
| CN | 101915551 | A | 12/2010 |
| CN | 201926426 | U | 8/2011 |
| CN | 204256479 | U | 4/2015 |
| CN | 204419137 | U | 6/2015 |
| WO | 2004094769 | A2 | 11/2004 |

OTHER PUBLICATIONS

International Preliminary Report on Patentabitlity issued in the PCT Application PCT/US2018/058353, dated May 14, 2020 (7 pages).
First Office Action issued in Chinese Patent Application No. 201880073351.1 dated Jun. 29, 2021, 15 pages with English translation.

\* cited by examiner

FIG. 8

IN PROCESS SCREEN PARAMETER MEASUREMENT AND CONTROL

CROSS-REFERENCE TO RELATED APPLICATION

The present document is a National Stage Entry of International Application No. PCT/US2018/058353, filed Oct. 31, 2018, which is based on and claims priority to U.S. Provisional Application Ser. No. 62/579,451, filed Oct. 31, 2017, which is incorporated herein by reference in its entirety.

BACKGROUND

In a variety of well applications, well completion tools are installed in a well for production of oil and gas. The well completion tools may be positioned along a tubing string having a series of tubulars with various tools including screens, valves, actuators, and/or other tools installed to perform operations related to the production of fluids from a formation. However, the flowing formation fluid may carry undesirable components, e.g. sand and other particulates, at extreme pressures and this can cause erosion of the tools positioned along the tubing string. Sand screens may be installed along the tubing string and may be combined with gravel packs to help prevent the inflow of sand from the formation while maintaining efficient production of formation fluid, e.g. oil and gas. The sand screen may comprise a wire wrapped filter manufactured by wrapping wire in a helical fashion around a base pipe having longitudinal rib wires spaced along the exterior surface of the base pipe. The helically wrapped wire is welded to the rib wires to secure the wires in place. The spacing between sequential helical wraps of the wire effectively forms a continuous slot through which hydrocarbons may flow as the particulates are filtered out and deposited in the surrounding annulus region. The slot width determines the size of particles filtered from the inflowing fluid. However, many difficulties can arise in maintaining a desired slot width during the screen manufacturing process.

SUMMARY

In general, a methodology and system facilitate construction of a wire-wrapped screen. A wrapping machine is operated with a sensor, e.g. a camera, positioned adjacent the wrapping machine while wire is wrapped to create the wire-wrapped screen. The sensor is used to obtain data on at least one parameter of the wire-wrapped screen during creation of the wire-wrapped screen. For example, a camera may be utilized in capturing images of the wire-wrapped screen as wire is wrapped about a base pipe. Data is provided to a controller in communication with the wrapping machine to improve the quality of the wire-wrapped screen. For example, data from the images obtained via the camera may be provided to the controller which is configured to determine slot width as the wire is wrapped. The controller is then able to provide feedback in real time to the wrapping machine so as to adjust operational parameters of the wrapping machine for maintaining a desired slot width.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The present disclosure generally relates to a well methodology and system which facilitate construction of high quality, wire-wrapped screens. According to an embodiment, a wrapping machine is operated with a sensor positioned adjacent the wrapping machine while wire is wrapped to create the wire-wrapped screen. The sensor is used to obtain data on at least one parameter of the wire-wrapped screen during creation of the wire-wrapped screen. The data is then processed so as to enable adjustment of the wrapping machine to improve the quality of the wire-wrapped screen. The data may be used in real time.

In one example, the sensor is in the form of a camera. The camera may be utilized in capturing images of the wire-wrapped screen as wire is wrapped about a base pipe. Data from the images obtained via the camera may be provided to a controller which is configured to determine slot width between wraps of the wire as the wire is wrapped about the base pipe, e.g. a ribbed base pipe. The controller is then able to provide feedback in real time to the wrapping machine so as to adjust operational parameters of the wrapping machine for maintaining a desired slot width. Maintenance of the desired slot width along the screen enhances the ability of the wire-wrapped screen to filter particulates of a desired size from inflowing fluid during, for example, hydrocarbon fluid production.

Figure 1:
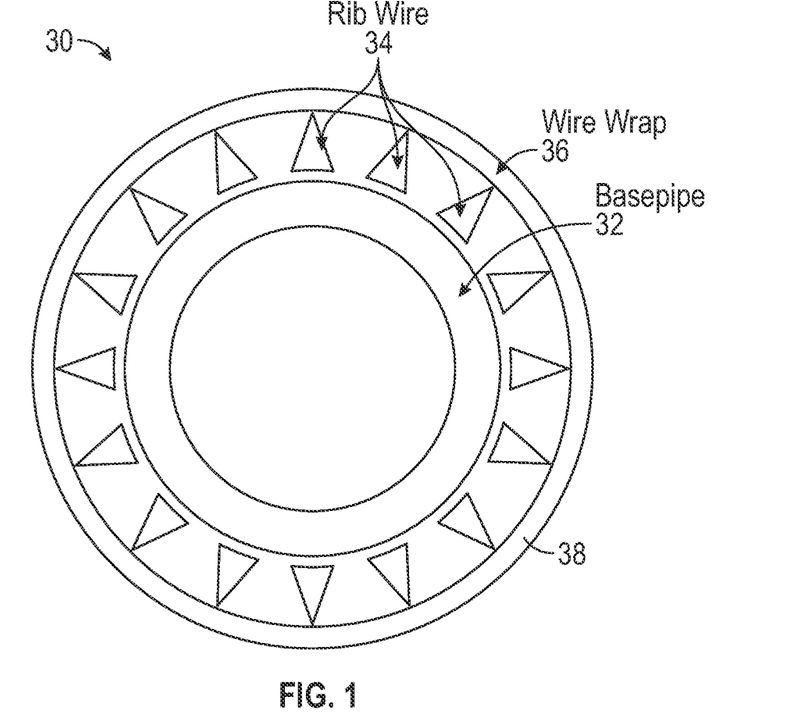
FIG. 1 is a schematic cross-sectional illustration of an example of a wire-wrapped screen which may be used to filter particulates during production of hydrocarbon fluid, according to an embodiment of the disclosure.
Figure 2:
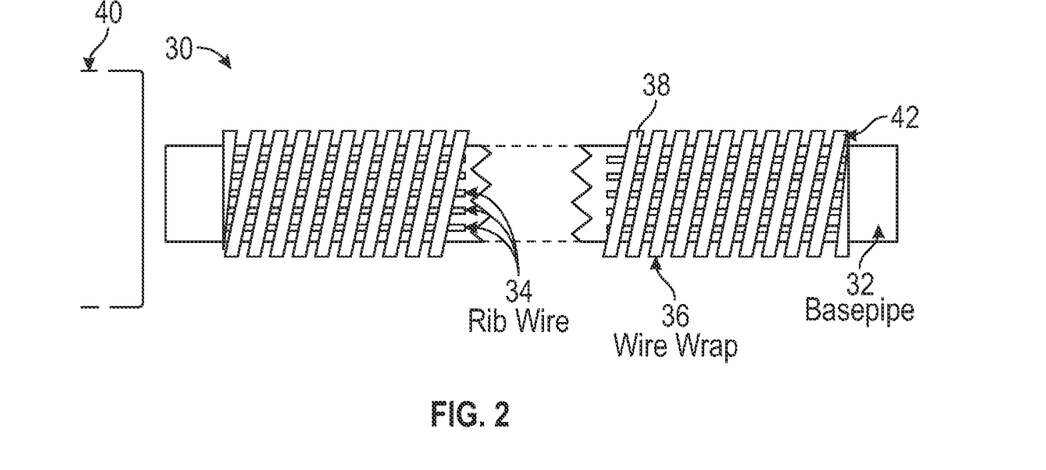
FIG. 2 is a schematic side view of the wire-wrapped screen illustrated in FIG. 1, according to an embodiment of the disclosure.

Referring generally to FIGS. 1 and 2, an embodiment of a sand screen 30 is illustrated in a cross-sectional view and a side view, respectively. In this example, the sand screen 30 comprises a base pipe 32, rib wires 34, and an outer wire wrap 36 formed by a wire 38 wrapped around the rib wires 34. By way of example, the wire 38 may be helically wrapped around the rib wires 34 and the base pipe 32 to create the wire wrap 36 as illustrated in FIG. 2.

The sand screen 30 may be manufactured using industry-standard materials and sizes or other suitable materials and sizes. For a variety of applications, the base pipe 32, rib wires 34, and wire wrap 36 may be constructed in suitable sizes—with dimensions and materials conventionally used in the manufacture of sand screens. The sand screen 30 may be manufactured via a wrapping machine 40, such as a variety of commercially available wrapping machines. Commercial wrapping machines are manufactured and/or sold by a variety of companies, including Schlumberger and ARC Specialties Inc.

A suitable manufacturing process may include initially obtaining a base pipe 32 of a suitable length and attaching the rib wires 34 to the base pipe 32 in a longitudinal direction. The rib wires 34 may be attached to the base pipe 32 by welding, fusing, or other suitable attachment techniques. In some embodiments, a pulsing current may be used to weld or fuse the material in a non-additive manner.

Once the rib wires 34 are secured to the base pipe 32, the ribbed base pipe is passed through the wrapping machine 40 which wraps the wire 38 around the rib wires 34 and base pipe 32. During wrapping, the base pipe 32 may be rotated about its longitudinal axis as it undergoes relative lengthwise movement through the wrapping machine 40. For example, the base pipe 32 may be rotated as the wrapping machine 40 moves lengthwise along the base pipe 32 or as the base pipe 32 is moved lengthwise through a stationary wrapping machine 40. The wire 38 is wrapped about the rib wires 34 and the base pipe 32 as the base pipe 32 rotates and moves linearly with respect to the wrapping machine 40 so as to create a filter 42 via the wire wrap 36. The filter 42 is able to filter out particulates from inflowing fluid during, for example, a hydrocarbon production operation. It should be noted the base pipe 32 may be perforated or have another type of inflow control opening or openings to enable flow of fluid from the exterior of the wire wrap 36 to the interior of the base pipe 32.

When the wire 38 is wrapped via the wrapping machine 40, the wire 38 may be welded, fused, or otherwise attached to the rib wires 34 to secure the wire 38 in place. For example, the wire 38 may be secured to the rib wires 34 as it is wrapped onto the ribbed base pipe (rib wires 34 and base pipe 32) in a helical pattern.

Figure 3:
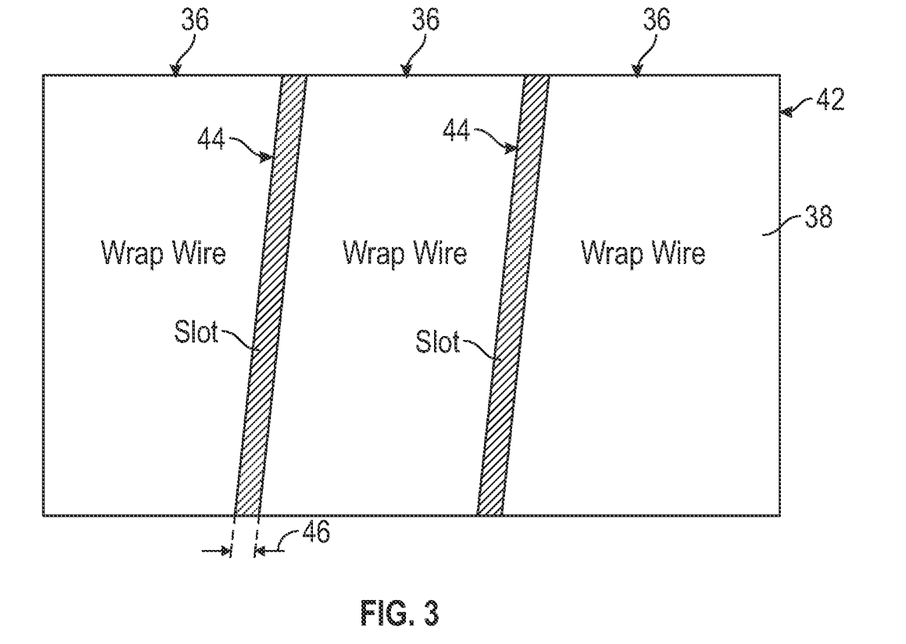
FIG. 3 is a close-up illustration of wrapped wire and the resulting slot located between wraps of the wire during construction of a wire-wrapped screen, according to an embodiment of the disclosure.

With additional reference to FIG. 3, a close up view of the wrapped wire 38 is provided to show a slot 44 between each successive wrap of the wire 38. Although the slot 44 may be a continuous slot, FIG. 3 shows that the slot 44 functions effectively as a plurality of slots located between the successive wraps of wire 38. The quality of the filter 42 provided by the wire wrap 36 is determined by the consistency and quality of the slot 44.

In the example illustrated in FIGS. 1-3, the width of slot 44 has been accurately controlled via a feedback system as discussed in greater detail below. Generally, the more consistent the width 46 of slot 44 and the more closely the slot width 46 is maintained within a desired range of widths or distribution of widths, the higher the quality of the slot 44 and overall sand screen 30.

Figure 4:
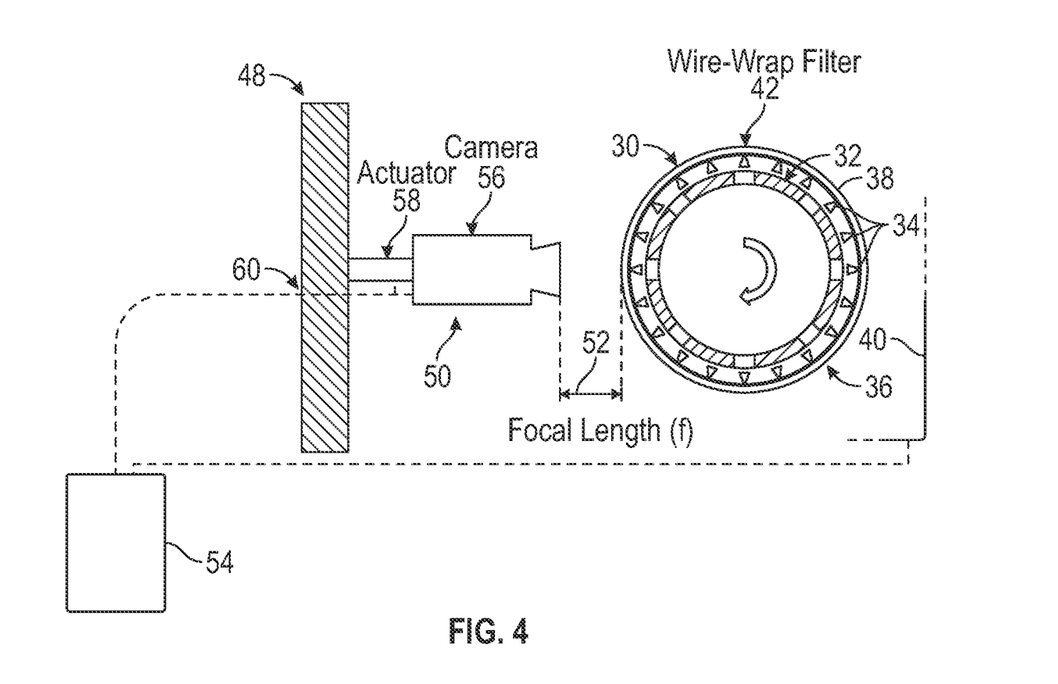
FIG. 4 is a schematic illustration of an example of a feedback system utilized during manufacture of the wire-wrapped screen, according to an embodiment of the disclosure.

Referring generally to FIG. 4, an example of a feedback system 48 is illustrated. The feedback system 48 may be positioned adjacent to the wrapping machine 40 where the wraps of wire 38 are applied over the rib wires 34. In some embodiments, the feedback system 48 may be attached to or integral with the wrapping machine 40. The feedback system 48 may be configured to monitor at least one parameter with respect to construction of the sand screen 30. For example, the feedback system 48 may be used to monitor slot width 46 as the wire 38 is wrapped about the rib wires 34 and base pipe 32. The feedback system 48 utilizes data acquired on the at least one parameter and provides corresponding instructions to the wrapping machine 40 so as to adjust operation of the wrapping machine.

As illustrated in FIG. 4, the feedback system 48 may comprise a sensor 50 located adjacent the wrapping machine 40. The sensor 50 may be selected to monitor at least one parameter with respect to positioning of the wire 38 as it is wrapped about the ribbed base pipe. The sensor 50 may comprise an individual sensor or a plurality of sensors positioned at a predetermined distance 52 from the wire 38 which has been wrapped about the rib wires 34 and base pipe 32.

The feedback system 48 further comprises a controller 54, e.g. a computer-based controller, programmed with logic to determine deviations of the at least one parameter from, for example, a reference parameter. The controller 54 is in communication with the wrapping machine 40 so as to provide instructions to the wrapping machine 40 to ensure proper placement of the wire 38. In some embodiments, the controller 54 may be configured to provide instructions to wrapping machine 40 in real time so as to cause real-time adjustments based on deviations of the at least one parameter from the reference parameter. Real-time adjustment of the wrapping process improves the quality of the wire-wrapped sand screen 30 and reduces costs otherwise associated with post-manufacture treatment.

According to an embodiment, the feedback system 48 is configured to obtain raw data measured from the wraps of wire 38 and/or additional data to enable determination of adjustment parameters. The adjustment parameters may be provided to wrapping machine 40 so as to modify the manner in which the wraps of wire 38 are being applied over the rib wires 34. For example, the feedback system 48 may provide instructions to wrapping machine 40 with respect to pitch adjustment during wrapping of wire 38.

The pitch adjustment instructions may be provided as a percentage or degree adjustment to be made with respect to the pitch of the wire 38 as it is wrapped about the rib wires 34. In some embodiments, the instruction data communicated by the feedback system 48 to the wrapping machine 40 may include a particular pitch setting value representing the pitch value at which it should operate. The instruction data also may include instructions regarding the speed at which the wrapping machine 40 should operate, e.g. instructions regarding the speed of rotation of the base pipe 32 and/or the speed at which the wrapping machine 40 moves linearly with respect to the base pipe 32 during wrapping. However, the feedback system 48 may be used to obtain data on a variety of parameters and to provide a variety of corresponding instructions to the wrapping machine 40.

According to one example, the sensor 50 of feedback system 48 is in the form of a camera 56 mounted on an actuator 58 which, in turn, may be attached to a backplane 60 or other suitable structure. The camera 56 may be mounted at the predetermined distance 52 which, in this case, is the focal length of the camera 56. It should be noted that in some embodiments the focal length may be adjusted through manipulation of a lens or lenses of the camera 56 or through digital software manipulation. Using this predetermined distance 52 between the camera 56 and the wraps of wire 38/slot(s) 44 enables the camera 56 to obtain clear images suitable for measurement and analysis.

The camera 56 may comprise a variety of digital type cameras or other suitable cameras. In some embodiments, a full-color image may be obtained at a suitable resolution. In other embodiments, however, the camera 56 may be selected for capturing a monochromatic image or other suitable type of image which allows determination of the desired parameter, e.g. slot width 46. The camera 56/sensor 50 also may utilize other technologies to determine the desired parameter, e.g. slot width 46. Examples of other technologies include ultrasonic technologies, laser technologies, infrared imaging, or other technologies able to obtain images which enable determination of slot width 46 (and/or other desired parameters).

In a variety of embodiments, the camera 56 may operate together with the wrapping machine 40 to measure the slot width 46 and slot quality in real time as the layer 38 is wrapped to form the filter 42. The measurements of slot width 46 may be determined from the images obtained by camera 56 and those images may be obtained concurrently with operation of the wrapping machine 40 as the wrapping machine 40 wraps the wire 38 about the rib wires 34 and base pipe 32. The controller 54 processes the data obtained via camera 56 and provides feedback to wrapping machine 40 so as to make adjustments in real time.

Real-time adjustments to the wrapping process helps ensure manufacture of a high quality, wire-wrapped sand screen 30. For example, if the wrapping machine 40 is producing slot widths that are at or near a threshold width, a pitch at which wire 38 is wrapped may be adjusted during operation of the wrapping machine 40. The adjustment may be made to effectively alter the width of the slots 44 so they are no longer at or near the threshold width. This capability of making operational adjustments on-the-fly during wrapping of the wire 38 ensures consistent construction quality. The resulting sand screens 30 perform substantially better with respect to consistent filtering of the desired particulates.

Referring again to FIG. 4, the actuator 58 is constructed to aid in maintaining the predetermined distance 52. Various types of actuators 58 may be used in maintaining the predetermined distance 52, e.g. focal length, between the camera 56/sensor 50 and the wraps of wire 38 separated by slots 46. For example, the actuator 58 may utilize pressurized air, springs, hydraulics, or other mechanisms to achieve desired positioning and functionality. Various hydraulic actuators, electro-mechanical actuators, and other suitable actuators 58 may be mounted to control positioning of camera 56, e.g. mounted between backplane 60 and camera 56.

The backplane 60 also may have various suitable forms. In some embodiments, the backplane 60 may be mechanically coupled to the wrapping machine 40. For example, the backplane 60 may be in the form of a flange or plate extending from the wrapping machine 40. Such mechanical coupling may aid in maintaining the predetermined distance 52 between the sensor 50/camera 56 and the wraps of wire 38. In other embodiments, the backplane 60 may be mechanically independent from the wrapping machine 40.

Due to large variations in spot weld parameters and also due to large tolerance variations between dimensions of base pipe 32, rib wires 34, and wrapped wire 38, it may be desirable to continuously adjust the position of camera 56. The position of camera 56 may be adjusted automatically to account for these variations and to maintain the predetermined distance/focal length 52 during construction of the sand screen 30. By way of example, the actuator 58 may be operated to provide continuous adjustment of the position of camera 56. In some embodiments, the actuator 58 also may be used to automatically compensate for vibrations.

Figure 5:
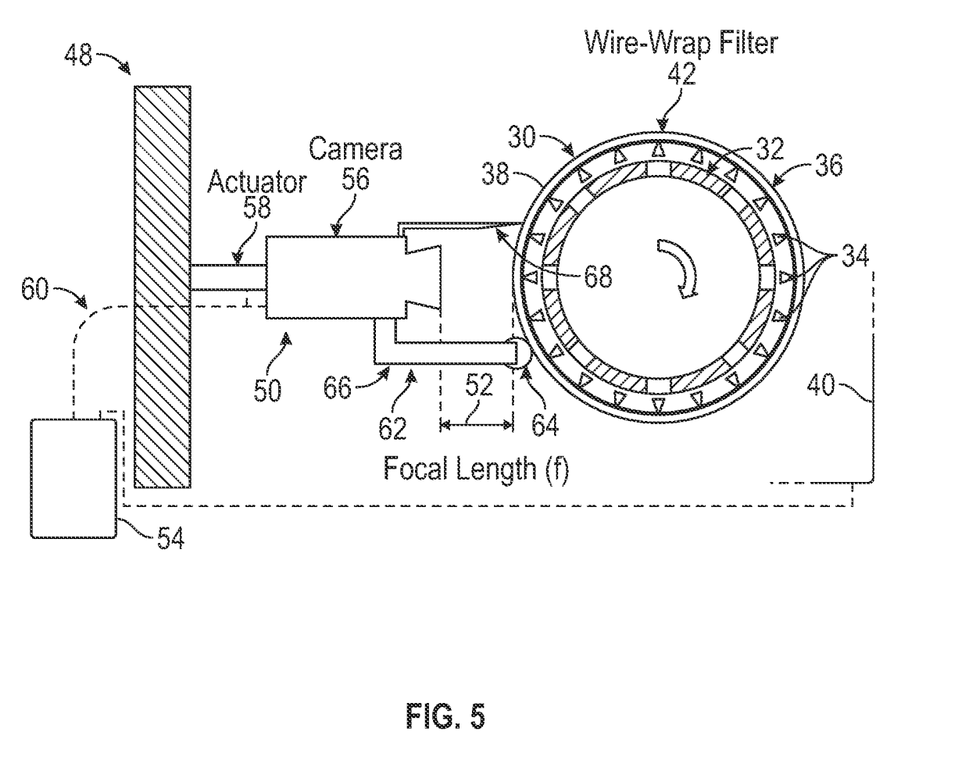
FIG. 5 is a schematic illustration of another example of a feedback system utilized during manufacture of the wire-wrapped screen, according to an embodiment of the disclosure.

Referring generally to FIG. 5, another embodiment of feedback system 48 is illustrated. In this embodiment, a distance member 62 is used to set the predetermined distance 52. By way of example, the distance member 62 may comprise a wheel 64 coupled to a rigid arm 66 extending from the camera 56 (or a suitable camera mounting) to aid in maintaining the desired, predetermined distance/focal length 52.

The wheel 64 may be placed in contact with the surface of the wraps of wire 38 at a location at or near the location from which images of the wraps of wire 38 are obtained. The wheel 64 may be configured to roll along the surface of the wire wrap 36 as the sand screen 30 is rotated and moved linearly outward from the wrapping machine 40 as the sand screen is rotated and as the wrapping machine 40 and the sand screen 30 are moved linearly with respect to each other.

In some embodiments, a light 68 may be positioned to help obtain high quality and consistent images via camera 56. The light 68 may be positioned to illuminate the location on the wraps of wire 38 where the camera 56 captures the images. In some embodiments, the light 68 may be positioned at a low angle to brighten the images without washing out the image and/or without providing undesirable glare. Additionally, the light 68 may have a variety of types and forms, e.g. single LED, multiple LEDs, a circular LED array, or other suitable lighting tools. The light 68 also may be coupled to the camera 56 or with a suitable camera mount. This ensures that the light 68 moves with the camera 56 and maintains a fixed position relative to the camera 56. In some embodiments, the light 68 may extend from the same arm 66 as wheel 64.

When a wire wrapping process starts, the actuator 58 may initially be operated to move the camera 56 towards the sand screen 30 being manufactured so that the camera 56 is positioned at the desired, predetermined distance 52. According to an embodiment, the contact between wheel 64 and the wire wrap 36 may be used to determine when the appropriate, predetermined distance 52 has been achieved. In some embodiments, other forms of distance measurement may be implemented. For example, a laser sensor or ultrasonic sensor may be provided and used to determine the desired distance 52 between the camera 56 and the sand screen 30.

As the sand screen 30 is rotated and moved outward from the wrapping machine 40, the camera 56 obtains images which are used to determine the desired parameter, e.g. slot width 46. According to one embodiment, the camera 56 may be triggered to capture an image between each weld joint of the rib wire 34 and the wire wrap 36. In this example, the camera 56 may be synced with a welder, e.g. a spot welder forming spot welds between wire 38 and rib wires 34, so as to capture an image for each of the welds. Each image captured by the camera 56 may be used to obtain data on one or more slots 44 on a single plane (see FIG. 3).

As wrapping continues via the wrapping machine 40, images may be obtained in multiple planes or along the entire length of slot 44 to obtain desired measurement data. The measurement data may be logged in a suitable memory, e.g. a database or file, of controller 54. The measurement data may be indexed along desired directions, e.g. axial and radial directions, of the wire-wrap filter 42 for post wrapping data analytics. The measurement data also may be utilized in performing a closed-loop feedback control of the wrapping machine 40 so as to adjust the monitored parameter, e.g. slot width 46.

Each type of sand screen 30 being manufactured may have predefined, desired parameters, e.g. a predefined nominal value and a predefined tolerance for slot width 46. These predefined parameters may arise from a desired performance of sand screens 30 and/or characteristics of a particular well into which the sand screens 30 may be deployed.

An example of a potential slot width specification for slots 44 between successive wraps of wire 38 in a given sand screen 30 is provided in Table I:

TABLE I

| Sand Screen Quality Control Specification | | | |
|---|---|---|---|
| | X % | Y % | Z % |
| Level 1 | $\pm A_1$ | $\pm B_1$ | $\pm C_1$ |
| Level 2 | $\pm A_2$ | $\pm B_2$ | $\pm C_2$ |
| ... | ... | ... | ... |
| Level N | $\pm A_n$ | $\pm B_n$ | $\pm C_n$ |

In this example, the specification provides that a given sand screen 30 is to have a minimum of X % of the slots 44 within (nominal−A, nominal+A), a minimum of Y % of the slots 44 within (nominal−B, nominal+B), and a minimum of Z % of the slots 44 within (nominal−C, nominal+C). (See also FIG. 6 which shows an example of a slot width measurement chart in terms of slot width measured relative to nominal−A, nominal+A, nominal−B, nominal+B, nominal−C, nominal+C.)

Figure 6:
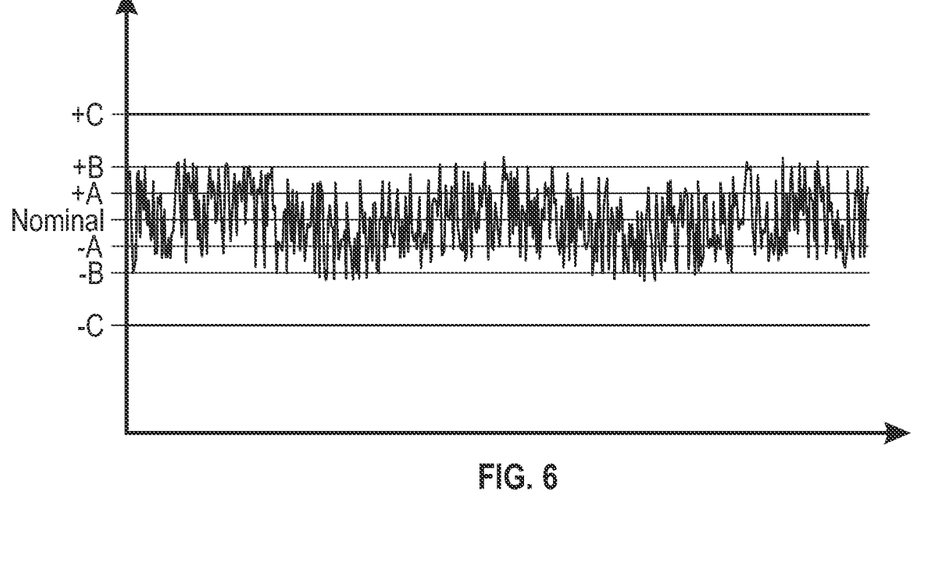
FIG. 6 is an illustration of an example of a slot width measurement chart, according to an embodiment of the disclosure.

As may be appreciated, in some cases a specification also may establish that no slot width 46 exceed a certain width or deviate from a desired width by more than a certain distance or percentage. In such cases, a single slot exceeding such width may cause the entire screen 30 to fall out of specification. However, there may be multiple specification levels for the sand screen inspection. An example slot width measurement charting for one plane is illustrated in FIG. 6.

The measurement data obtained from sensor 50/camera 56 may be utilized via controller 54 in performing a closed-loop feedback control on the wrapping machine 40. As the slot width 46 is monitored, for example, a control loop may be utilized in which in-process data (e.g. slot width, pitch of wire 38, speed) is fed back to controller 54. The controller 54 outputs control signals to adjust the wrapping machine 40 so as to produce slots 44 which are closer to a nominal width (or within the sand screen specification width distribution) before completing the wrapping.

Figure 7:
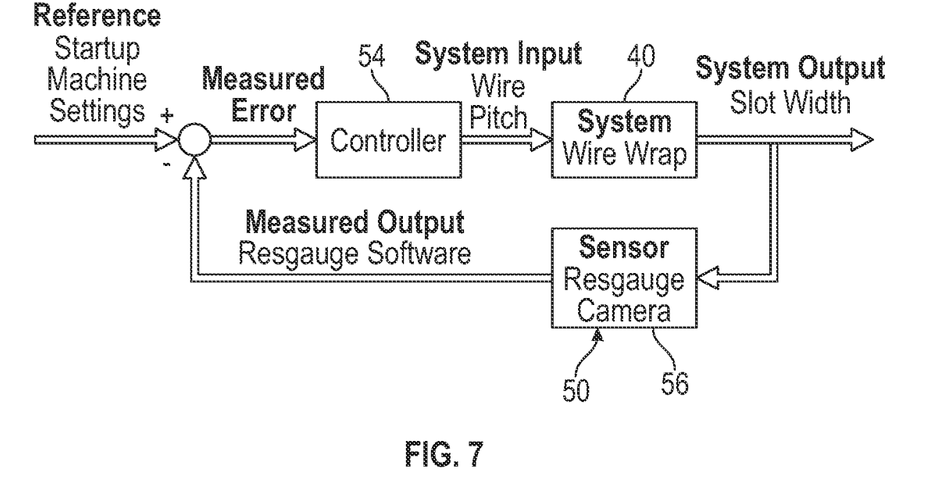
FIG. 7 is a diagrammatic illustration of a feedback control implemented via the feedback system during manufacture of the wire-wrapped screen, according to an embodiment of the disclosure.

Referring generally to FIG. 7, an example feedback control diagram is illustrated. In this example, a control algorithm is programmed into the controller 54 and is utilized to minimize the difference between a measured parameter and a reference parameter, e.g. between a measured slot width 46 and a pre-defined nominal value. Certain traditional feedback control algorithms, such as Proportional-Integral-Differentiate (PID) and State Space Feedback, are suitable for the feedback control loop in some applications. Other more advanced predictive models also may be suitable for providing the desired control, e.g. Smith Predictor, for compensating pure time delay in the measuring process. Neural Network also can be utilized, after analyzing homogeneous data, to predict the performance of the wrapping machine 40 and the trending of slot width 46.

By way of example, the camera 56 may be applied as a data acquisition mechanism in the feedback system 48. The camera 56 acquires images which are a data source to the controller 54 which may be used, for example, to measure and analyze slot width 46 based on those images. In this embodiment, the camera 56 also serves as the data source for data in providing feedback to the wrapping machine 40 for improved wrapping performance.

Depending on the operation, the wrapping machine may perform a more dynamic non-machine feedback loop or a more static off-machine feedback loop. The data obtained via camera 56 also may be used to design and fine-tune control algorithms, e.g. PID, State Space Feedback, Smith Protector, or other suitable control algorithms. Then, the fine-tuned control algorithm may be applied to the wrapping machine 40.

New data acquired from the wrapping machine 40 may be used as part of the implementation of the control algorithm and may be constantly fed back to the control algorithm in the controller 54 to enable calculation of new machine parameters which guarantee wrapping performance and screen quality. New data acquired from the wrapping machine 40 also may be applied as training datasets to train and validate an on-machine learning control algorithm for the wrapping machine 40. Such algorithms are capable of identifying and categorizing different sets of control parameters to their correlated machine wrapping performance data. Thus, in real-time, the feedback system 48 is able to select desirable control parameters to govern performance of wrapping machine 40.

The camera 56 in cooperation with the controller 54 enables feedback system 48 to operate with a variety of traditional wrapping machines 40. The controller 54 is able to analyze and retrieve, for example, slot width information from the raw format data, e.g. from images from the camera or from direct reading of data from other sensors, such as ultrasonic sensors or laser sensors. The controller 54 is able to organize the gathered data into the correct format for later control algorithm calculation.

Referring again to FIG. 7, reference data such as startup machine settings and parameters may initially be input. Based on these initial machine settings and parameters, the operating parameters for the wrapping machine 40 and the feedback system 48 may be set. The controller 54 receives the reference data and initiates operation of the feedback system 48 by providing the operating parameters, e.g. wire pitch, to wrapping machine 40. Wrapping machine 40 then wraps the wire 38 to create the filter 42 with a desired slot width 46.

The sensor 50, e.g. camera 56, obtains sensor data, e.g. images, and the controller 54 determines the parameters related to the filter 42, e.g. slot width 46. These parameters are then compared with the reference parameters and a measured error is provided. The controller 54 is then able to adjust the operating parameters, e.g. wire pitch, for the wrapping machine 40. In other words, the controller 54 is able to adjust the desired parameter on-the-fly as the wire wrapping occurs in wrapping machine 40. Consequently, the wire wrapping process may be controlled to tight tolerances and the quality of the sand screen 30 is substantially improved during manufacture of the sand screen 30 rather than by implementing post manufacture adjustments.

Figure 8:
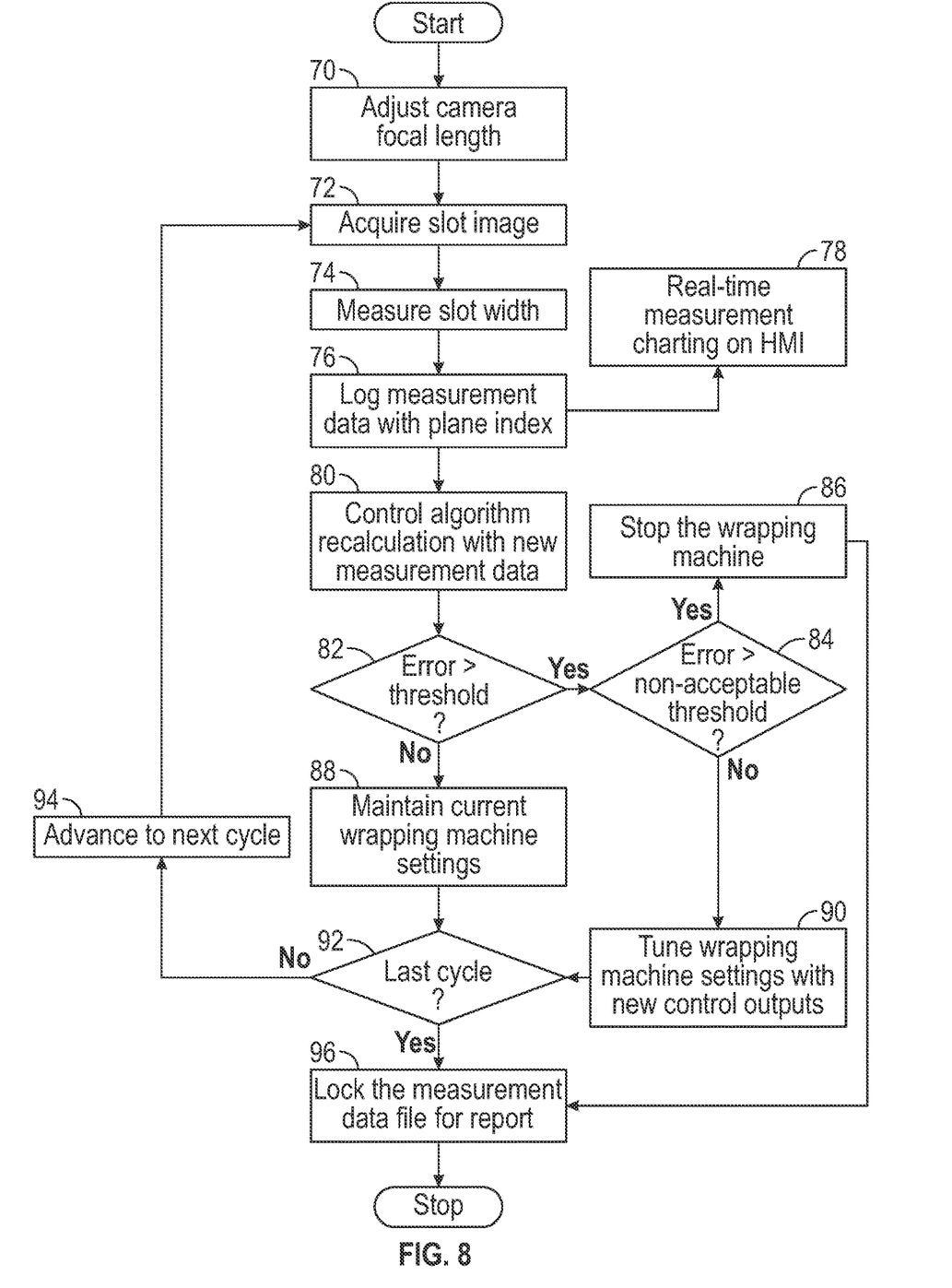
FIG. 8 is a flow chart illustrating an example of a flow diagram for operation of a feedback system during manufacture of a wire-wrapped screen, according to an embodiment of the disclosure.

Referring generally to FIG. 8, a flowchart is illustrated which shows an example of a slot width measuring process. It should be appreciated that the slot width measuring process may provide data used by the control loop (see FIG. 7) to adjust and fine-tune the wrapping process. In some embodiments, the slot width measuring process may be initiated upon initiation of the wrapping machine 40. In other embodiments, the slot width measuring process may be initiated upon receiving user input or upon sensing a wrapped screen filter exiting the wrapping machine 40.

The illustrated example of the slot width measuring process comprises initially positioning the camera 56 relative to the wire wrap 36 (filter 42) to achieve a desired focal length, as represented by block 70. Slot images are then captured via camera 56, as represented by block 72. The slot width 46 is then measured based on data in the captured image, as represented by block 74.

Suitable image processing and/or boundary or shape determining software may be implemented to aid in the measurement process. For example, measurement data with plane index data may be logged, as represented by block 76. This process may involve real-time measurement charting, as represented by block 78. Controller 54 utilizes the appropriate algorithm to process the new data obtained via camera 56 and to provide new measurement data with respect to the slot width 46, as represented by block 80.

The controller 54 may be programmed to check whether the new measurement data is greater than a predetermined reference value, e.g. above a threshold, as represented by decision block 82. If yes, a decision is made via controller 54 as to whether the new measurement data is above a non-acceptable threshold, as represented by decision block 84. If yes, the wrapping machine 40 may be stopped, as represented by block 86.

On the other hand, if the new measurement data is within the desired threshold, the settings of wrapping machine 40 are maintained, as represented by block 88. If the new data is within the non-acceptable threshold at decision block 84, the settings of wrapping machine 40 may be adjusted during the wrapping operation, as represented by block 90. The controller 54 may then determine whether control of the wrapping machine 40 is on its last cycle, as represented by decision block 92. If not, the cycles are continued by acquiring additional images, as represented by block 94. Once the wrapping machine reaches its last cycle or is otherwise stopped, the measurement data file may be locked for providing suitable reports, as represented by block 96.

It should be appreciated that alternate techniques, measurements, metrics, and specifications may be utilized in other implementations of feedback system 48. In some embodiments, for example, limitations may include a threshold percentage of slot widths 46 which do not exceed a specified width. In some embodiments, the controller 54 may be programmed to control slot width 46 according to an average slot width. Regardless of the programmed parameters, the feedback system 48 may be used in making appropriate adjustments on-the-fly so as to output the desired sand screen 30 in compliance with the desired specification.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method of manufacturing a screen, comprising:
operating a wrapping machine to wrap a wire about a base pipe in a manner which creates a slot between wraps of the wire during creation of a wire-wrapped screen; and
during operation of the wrapping machine:
rotating the base pipe along a longitudinal axis of the base pipe;
capturing images of the wire wrapped about the base pipe using a camera positioned adjacent the wrapping machine at a predetermined distance from the wire wrapped about the base pipe, wherein:
the predetermined distance is set according to a distance member;
capturing the images of the wire wrapped about the base pipe includes using the distance member to automatically adjust a position of the camera, during operation of the wrapping machine, to maintain the predetermined distance;
the distance member comprises a wheel coupled to a rigid arm, the rigid arm extending from the camera to the wire wrapped about the base pipe; and
the wheel is in contact with a surface of the wire and configured to roll along the surface of the wire as the base pipe rotates;
using a controller to process the images for determining a width of the slot between wraps;
providing feedback in real-time, via the controller, to the wrapping machine regarding the width of the slot; and
adjusting operating parameters of the wrapping machine based on the feedback regarding the width of the slot.

2. The method as recited in claim 1, wherein the predetermined distance corresponds to a focal length of the camera.

3. The method as recited in claim 1, wherein the base pipe comprises a ribbed base pipe, and wherein the operating comprises:
moving the wrapping machine lengthwise along the ribbed base pipe; and
welding the wire to ribbing of the ribbed base pipe to form the wire into a continuous helical wire wrap about the ribbed base pipe.

4. The method as recited in claim 1, further comprising positioning and focusing a lens of the camera.

5. The method as recited in claim 1, wherein adjusting operating parameters comprises adjusting a pitch of the wire.

6. A system for wrapping a screen, comprising:
a wrapping machine configured to receive a ribbed base pipe, the wrapping machine comprising mechanisms to:
rotate the ribbed base pipe along a longitudinal axis of the ribbed base pipe;
wrap a wire about the ribbed base pipe in a helical pattern while welding the wire to ribs of the ribbed base pipe to create a slot between wraps of the wire during creation of a wire-wrapped screen; and
a feedback system having:
a camera adjacent the wrapping machine, the camera monitoring at least one parameter with respect to positioning of the wire wrapped about the ribbed base pipe, wherein the camera is positioned a predetermined distanced from the wire wrapped about the ribbed base pipe, and wherein the camera is configured to capture images of the wire wrapped about the ribbed base pipe;

a distance member configured to automatically adjust a position of the camera, during operation of the wrapping machine, to maintain the predetermined distance, wherein the distance member comprises a wheel coupled to a rigid arm, the rigid arm extending from the camera to the wire wrapped about the base pipe, and wherein the wheel is in contact with a surface of the wire and configured to roll along the surface of the wire as the base pipe rotates; and a controller programmed with logic to:
  process the images to determine a width slot between wraps;
  provide feedback in real-time, via the controller, to the wrapping machine regarding the width of the slot; and
  cause the wrapping machine to make real-time adjustments of operating parameters of the wrapping machine based on the feedback regarding the width of the slot.

7. The system as recited in claim 6, further comprising an actuator coupled to the camera to control positioning of the camera.

8. The method as recited in claim 1, wherein automatically adjusting the position of the camera, during the operation of the wrapping machine, to maintain the predetermined distance includes using an actuator to adjust a position of the camera to maintain the predetermined distance.

9. The method as recited in claim 1, wherein capturing the images of the wire wrapped about the base pipe using the camera comprises capturing an image of the slot between each successive wrap of the wire.

10. The method as recited in claim 1, further comprising indexing and storing in memory measurement data associated with the images for use after creation of the wire-wrapped screen.

11. The method as recited in claim 1, wherein adjusting the operating parameters comprises changing the width of the slot.

12. The method as recited in claim 1, further comprising projecting light to an area, via a light source, to facilitate the capturing of the images.

13. The method as recited in claim 5, wherein adjusting the operating parameters further comprises adjusting a speed the wrapping machine wraps the wire about the base pipe.

\* \* \* \* \*